United States Patent [19]
O'Brien

[11] 4,454,588
[45] Jun. 12, 1984

[54] AUTOMATIC ACCEPTANCE TEST SYSTEM FOR AIRCRAFT COMPUTERS

[75] Inventor: James P. O'Brien, Redmond, Wash.

[73] Assignee: Sundstrand Data Control, Inc., Rockford, Ill.

[21] Appl. No.: 302,874

[22] Filed: Sep. 16, 1981

[51] Int. Cl.³ .............................................. G06F 11/00
[52] U.S. Cl. ..................................... 364/551; 364/579; 371/16
[58] Field of Search ............... 364/424, 186, 551, 579, 364/580, 200, 900, 184–187; 371/16

[56] References Cited

U.S. PATENT DOCUMENTS

| | | | |
|---|---|---|---|
| 3,967,103 | 6/1976 | Cachuela et al. | 371/25 |
| 4,115,847 | 9/1978 | Osder et al. | 364/186 X |
| 4,155,116 | 5/1979 | Tawfik et al. | 364/424 X |
| 4,311,466 | 1/1982 | Carpenter et al. | 364/578 X |
| 4,327,408 | 4/1982 | Frissell et al. | 371/16 X |

Primary Examiner—Felix D. Gruber
Assistant Examiner—Ronni S. Malamud
Attorney, Agent, or Firm—Ted E. Killingsworth; Michael B. McMurry; Harold A. Williamson

[57] ABSTRACT

In order to provide for substantially reduced costs in acceptance testing of aircraft computers, the acceptance test system described herein includes: a group of input circuits for receiving the computer output data signals; an input circuit adapted to receive signals from the aircraft computer representing the computer input data signals; and a transmitter for transmitting the computer input data to the computer. In this automatic acceptance test system, the computer under test generates both serial and parallel input data signals for itself which are then retransmitted to the computer under test by the automatic test system.

8 Claims, 1 Drawing Figure

AUTOMATIC ACCEPTANCE TEST SYSTEM FOR AIRCRAFT COMPUTERS

TECHNICAL FIELD

The invention relates to the field of automatic acceptance test systems for aircraft computers and in particular relates to an automatic acceptance test system that provides an aircraft computer with test data representing aircraft flight parameters.

BACKGROUND OF THE INVENTION

Many maintenance and performance tests are performed on aircraft computers utilizing built-in test equipment (BITE) such that the operation of the computer can be continuously verified. However, there are certain types of tests, for example those that relate to testing of the input and output data circuits of the computer, that require external test equipment in order to ensure that the computer is operating at an acceptable level.

Due to the requirement for a source of input data and the requirement for testing the output circuits of the aircraft computer under test, existing aircraft computer acceptance test systems typically require complex and expensive test equipment including dedicated testers to produce the required aircraft data input along with equipment for receiving the output signals of the aircraft computer as well as other types of specific test equipment. In addition, the prior art acceptance test systems call for complex and involved test procedures which in turn requires highly trained personnel. As a result, existing acceptance test systems are costly to build and maintain along with requiring training programs.

SUMMARY OF THE INVENTION

It is therefore an object of the invention to provide an automatic acceptance test system for use with an aircraft computer having a number of serial data input circuits, a number of discrete data inputs and a number of outputs; a first group of input circuits for receiving signals from the aircraft computer representing aircraft output data; an input circuit adapted to receive signals from the aircraft computer representing aircraft computer input data signals; a transmitter for transmitting the signals representing aircraft computer input data to the aircraft computer data inputs; and an indicator responsive to the signals representing the aircraft computer output data for providing an operator indication of aircraft output data.

It is an additional object of the invention to provide an aircraft computer having a processor; a program memory; a group of input circuits for receiving input data signals representing various aircraft flight parameters; and one or more output circuits for transmitting data output signals from the computer; a test signal circuit for transmitting test data signals corresponding to the input data signals from the computer; internal data transmission data circuits connecting the processor, the program memory, the input circuits, the output circuit and the test signal circuit; and a circuit including a portion of the program memory, the processor, the internal data transmitting circuits and the test signal circuit for generating signals representing a predetermined sequence of computer input data.

A further object of the invention is to provide an aircraft computer automatic acceptance test system including an aircraft computer having a processor, a program memory, a group of data input circuits for receiving input data signals representing aircraft flight parameters, a group of data output circuits for transmitting data output signals from the aircraft computer representing aircraft conditions, a test signal circuit for transmiting test data signals corresponding to the input data signals, internal data transmission circuits connecting the processor, the program memory, the input circuits, the output circuits and the test signal circuit, and a circuit including part of the program memory, the processor, the internal data transmitting circuits and the test signal circuit for generating signals representing a predetermined sequence of input data signals. The system also including a test fixture having a first fixture input circuit connected to the data output circuits; a second fixture input circuit connected to the test signal circuit, indicators responsive to the first fixture input circuit for providing an operator indication of the aircraft conditions, and a circuit responsive to the second fixture input circuit and adapted for connection to the data input circuits for transmitting said predetermined sequence of input data signals to the aircraft computer.

BRIEF DESCRIPTION OF THE DRAWING

The FIGURE is a block diagram of the automatic acceptance test system for aircraft computers.

DETAILED DESCRIPTION OF THE INVENTION

Figure 1:
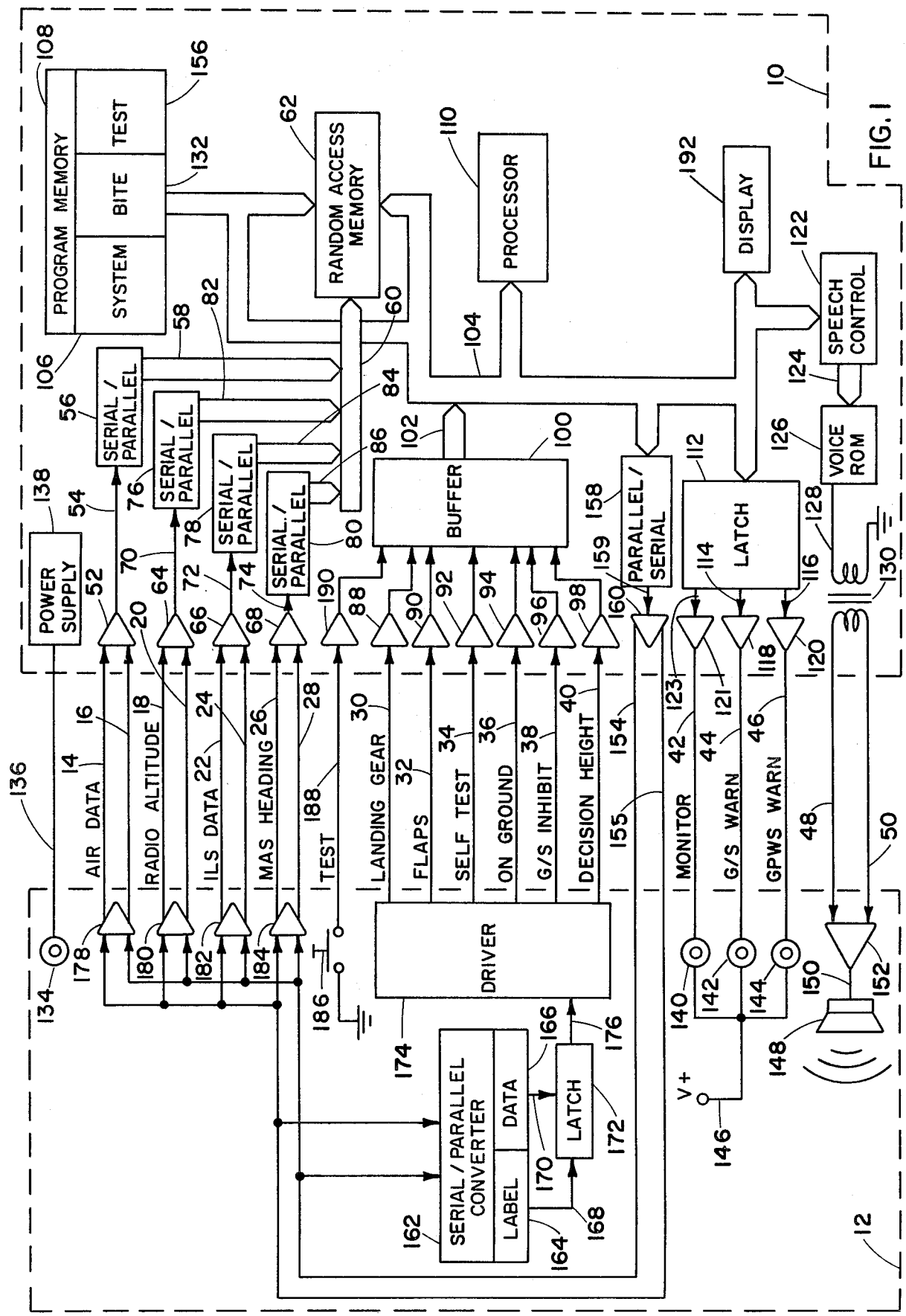

In the FIGURE is illustrated the preferred embodiment of the invention. On the right-hand side of FIG. 1 enclosed by the dashed lines 10 is an aircraft computer and for the purpose of illustrating the invention the particular aircraft computer shown is a ground proximity warning system computer. More detailed disclosures of aircraft ground proximity warning computers are provided in U.S. Pat. Nos. 3,946,358; 3,958,218; 3,944,968; 3,947,809; 3,947,808; 3,947,810; 3,925,751; 3,934,222; 4,060,793; 4,030,065; and 4,215,334 and British Pat. No. 1,567,554. The primary function of an aircraft ground proximity warning computer 10 is to provide visual and aural warnings to the crew when the aircraft inadvertently approaches the terrain.

Also, shown in FIG. 1 is an automatic acceptance test fixture enclosed by the dashed lines 12 for performing on the computer 10 a series of tests which cannot be performed on the computer 10 when it is installed in the aircraft. In the FIGURE, the test fixture 12 is shown connected to the computer 10 by a number of data transmission lines as would be the case when more extensive testing of the computer is required than is possible through the normal built-in test equipment.

Included in the data inputs to the computer 10 is an air data input over lines 14 and 16 which represents air data parameters including airspeed, barometric altitude and barometric altitude rate. When the computer is installed in the aircraft, this information is received on lines 14 and 16 in bit serial form in conformity with the ARINC 429 serial data format from a data bus in the aircraft. Aeronautical Radio Incorporated (ARINC) is a corporation that specifies various form, fit and function characteristics including signal formats for avionics equipment used commercial aircraft. In the preferred embodiment of the invention shown in the FIGURE, the information on lines 14 and 16 in the ARINC 429 data format represents the output from an ARINC 706 specified air data system. Another source of serial data input is transmitted to the computer 10 on lines 18 and 20 and represents ARINC 707 specified radio altimeter data including serial digital data signals that represent the aircraft radio altitude or height above the terrain. Also input to the computer 10 on lines 22 and 24 in serial digital data form are signals from an ARINC 710 specified instrument landing system (ILS) which includes ILS frequencies, glide slope deviation signals and selected runway headings. As shown in FIG. 1, another category of serial digital data for the computer 10 is received over lines 26 and 28 from an ARINC 704 specified source representing in bit serial form MAS headings.

In addition to the above described bit serial inputs, the computer 10 is configured to receive from the aircraft certain discrete data signals including landing gear position on line 30, flap position on line 32, a self-test signal over line 34, an on-the-ground signal over line 36, a glide slope inhibit signal on line 38 and a decision height signal on line 40. The signals on lines 30 and 32 are used to give an indication as to whether the aircraft's landing gear is up or down or if the flaps are in a landing position or not. The self-test signal on line 34 is a signal initiated by the crew to cause the computer 10 to go through a self-test routine before the aircraft takes off. The function of the glide slope inhibit signal on line 36 is to permit the air crew to inhibit the glide slope warning function when the aircraft is in flight.

Outputs of the aircraft ground proximity warning computer 10 include discrete signals on lines 42, 44 and 46 which represent respectively a monitor signal which provides an indication of computer malfunction to the crew, a glide slope warning light and a ground proximity warning system warning light. In addition, signals are transmitted from the computer 10 on lines 48 and 50 to a speaker in the cockpit to generate aural or voice warnings for the crew.

In order to better understand the operation of the invention, the operation of the computer will be described first, although it will be understood that the particular computer being described is provided as an illustration and the invention in fact relates to aircraft computers in general. The ARINC 429 serial data on lines 14 and 16 is received in a buffer amplifier 52 and then transmitted over a line 54 to a serial-to-parallel data converter circuit 56 that converts the serial data to 32-bit parallel words. The output of the serial-to-parallel data converter is then transmitted over lines 58 to a data bus 60 which serves to input the data into a random access memory 62. In a similar manner, the serial digital data on lines 18 and 20, 22 and 24, and 26 and 28 are input to buffer amplifiers 64, 66 and 68 in the computer 10. Serial data from the buffer amplifiers is then transmitted over lines 70, 72 and 74 to serial-to-parallel data converters 76, 77 and 80 which convert the ARINC 429 serial data into 32 bit parallel words that are input into the data bus 60 and hence the random access memory 62 by means of lines 82, 84 and 86 respectively.

The discrete inputs are received in the computer 10 from a group of amplifiers 88, 90, 92, 89, 96 and 98 from lines 30, 32, 34, 36, 38 and 40 respectively. The various discrete signals are received in a buffer 100 which serves to convert the various discrete inputs into data words that are output on lines 102 to a computer data bus 104.

In normal operation, the computer 10 utilizes the various inputs described above which represent aircraft flight parameters to generate warnings if the aircraft should inadvertently approach the terrain. The computer 10 operates under control of a system program 106 stored in a read only memory 108 to control a microprocessor 110. The data is transmitted between the processor random access memory and read only memory by means of the data bus 104. For simplicity of illustration, it should be understood that the data bus 104 also represents the appropriate address and control buses for the computer 10. The criteria for generating ground proximity warnings are disclosed in detail in U.S. Pat. Nos. 3,946,358; 3,958,218; 3,944,968; 3,947,809; 3,947,808; 3,947,810; 93,925,751; 3,934,222; 4,060,793; 4,030,065; and 4,215,334 and British Pat. No. 1,567,554.

When a warning is generated, the appropriate data signals are transmitted by the processor 110 over the bus 104 to a latch circuit 112 which converts the warning into the appropriate discrete signal such as a glide slope warning on a line 114 or a ground proximity warning system warning on line 116. These signals are then output by means of amplifiers 118 or 120 from the computer 10 to lines 44 and 46 respectively. An amplifier 121 which is connected by means of a line 123 to the latch 112 transmits a discrete signal to the monitor line 42. In addition to discrete signals on lines 44 and 46 that serve to illuminate visual warnings in the aircraft cockpit, voice warnings can also be generated by the computer for transmission to a loud speaker in the cockpit. A speech control unit 122 responds to warning data on bus 104 to select by means of lines 124 predetermined words and sounds stored in a voice read only memory 126 for transmision over a line 128 to a transformer 130. The output of the transformer 130 is connected to output lines 48 and 50.

As is the current practice for microprocessor based aircraft computers, the computer 10 illustrated in FIG. 1 also includes extensive built-in test or BITE routines for comprehensively testing the various components and programs of the computer. The processor 110 executes the BITE routines under control of BITE programs stored in a portion 132 of the program memory 108. However, as indicated earlier, BITE routines are unable to test certain aspects of the computer 10 such as the input output functions. Therefore in order to completely test a computer system, such as for an acceptance test, it is necessary to connect the computer 10 to an outside source of signals. In order to implement the acceptance test procedure, the test fixture 12 is connected to the computer input data lines 14 through 40 and the computer output data lines 42 through 50. The test fixture 12 includes a lamp 134 which is connected by means of a line 136 to the computer power supply 138. In addition, the test fixture 12 includes a lamp 140 connected to the monitor line 42, a lamp 142 connected to the glide slope warning line 44 and a lamp 144 connected to the ground proximity warning line 46. The lamps 140, 142 and 144 are in turn connected to a voltage source 146 which causes the lamps to be illuminated in response to discrete signals on the lines 42, 44 or 46. A speaker 148 connected by a line 150 to an amplifier 152 which in turn is connected to the voice lines 48 and 50 is provided in the test fixture 12 to give a test operator a means for actually listening to the voice outputs of the computer 10.

In order to eliminate the need for an independent source of input signals to the computer 10 for thoroughly testing the computer 10 and more particularly to test the input circuits of the computer, the test fixture 12 responds to signals on lines 154 and 155. The processor 110 in the computer 10 will respond to an acceptance test program stored in an area 156 of the program memory 108 to generate on the bus 104 a series of data input words for the computer 10. These data input words which are in a bit parallel format on a line 159 and bus 104 are converted by a serial-to-parallel converter circuit 158 to ARINC 429 serial data that is output by means of an amplifier 160 to lines 154 and 155. The serial data on lines 154 and 155 represents serial input data for the computer 10 including ARINC 706 air data for lines 14 and 16 and ARINC 707 radio altimeter data on lines 18 and 20. In addition to the serial data, the data on lines 154 and 155 includes discrete data which is intended for use on lines 30 through 40. The serial data on lines 154 and 155 is then transmitted to a serial-to-parallel converter 162 which includes a label portion 164 and a data portion 166 that provide input over lines 168 and 170 to a latch circuit 172. A driver circuit 174 receives the appropriate latched discrete signal from a line 176 and generates the appropriate signals on discrete data input lines 30 through 40.

The serial data transmitted from the computer 10 on lines 154 and 155 is then applied to a series of buffer amplifiers 178, 180, 182, and 184 that in turn are connected to the serial data inputs on lines 14 through 28.

In order to initiate the automatic test procedure, the test fixture 12 includes a switch 186 which is connected by means of a line 188 to an amplifier 190 in the computer 10 that in turn is connected to the buffer 100. Depression of the switch 186 will cause the buffer to generate the appropriate signal on the data bus 104 to cause the microprocessor to initiate the automatic acceptance test procedure stored in the portion 156 of the read only memory 108. During the automatic acceptance test procedure the computer 10 transmits test input data over lines 154 and 155 to the test fixture 12. The serial digital data is buffered by means of amplifiers 178, 180, 182 and 184 and sent back to the computer 10 from the test fixture 12 and verified by the processor 110 for the correct content in order to test the serial digital transmission and receiving circuits. Serial digital data received by the test fixture 12 by the computer 10 is converted into parallel digital form latched in the latch 172 and sent to the computer 10 over lines 30 through 40. The discrete inputs are then verified by the processor 110 for correct content in order to test the discrete digital input circuits.

Included in the computer 10 is a display 192 which can be used by a test operator to determine the condition of the computer 10. The display 192 is controlled by the processor under the program stored in the read only memory 108 by means of the data bus 104.

The above described automatic test system provides very significant advantages over prior existing systems in that the entire test procedure is run under control of the processor 110 utilizing read only memory instructions from the test program 156 stored in the program memory 108 thereby substantially lessening the requirements of the test operator to perform individual tests and eliminating the need for a separate piece of equipment to generate the appropriate test input data. The system also has the additional advantage of being able to directly compare input data since it generates the input data in its own system. Thus a very wide range of test inputs can be provided to the computer 10 under test without the requirement for separately programming a test fixture to provide the data inputs. A further advantage of the arrangement shown in FIG. 1 is that a wide variety of aircraft computers or aircraft computers having differing software modifications can be tested using the same relatively inexpensive test fixture wihtout the need for making changes to the test fixture for each software modification.

I claim:

1. An automatic acceptance test system for use with an aircraft computer having a plurality of data signal inputs, a plurality of discrete data inputs and a plurality of outputs wherein the automatic acceptance test system comprises:
   first input means for receiving signals from the aircraft computer outputs representing aircraft test output data;
   second input means for receiving signals from the aircraft computer representing aircraft computer test input data signals;
   transmitter means for transmitting said signals representing aircraft computer test input data to the aircraft computer data signal inputs; and
   indicator means responsive to said signals representing aircraft computer test output data for providing an operator indication of aircraft output data.

2. The test system of claim 1 wherein said second input means includes means for receiving said aircraft computer test input data in serial data form from the aircraft computer; and
   said transmitter means includes means for converting a predetermined portion of said aircraft computer test input data in serial data form into parallel data.

3. The test system of claim 2 wherein said converting means includes means for latching said parallel data.

4. The test system of claim 2 wherein said indicator means includes a speaker for generating aural output signals.

5. An aircraft computer comprising:
   a processor;
   a program memory;
   a plurality of input circuits for receiving input data signals representing aircraft flight parameters;
   at least one output circuit for transmitting data output signals from the computer;
   a test signal circuit for transmitting from the computer test data signals corresponding to said input data signals;
   an internal data transmission bus operatively connecting said processor, said program memory, said input circuits, said output circuit and said test signal circuit; and
   means including said processor, said internal data transmitting circuits, said test signal circuit and a predetermined portion of said program memory for generating signals representing a predetermined sequence of input data signals.

6. The aircraft computer of claim 5 wherein said test signal circuit generates a serial digital output representing said input data signals wherein said input data signals include discrete input signals.

7. The computer of claim 6 including a display operatively connected by means of said internal data transmission bus to said processor and means responsive to said program memory and said input data signals to generate predetermined system condition messages on said display.

8. An aircraft computer automatic acceptance test system comprising:

An aircraft computer including:
- a processor;
- a program memory;
- a plurality of data input circuits for receiving input data signals representing aircraft flight parameters;
- a plurality of data output circuits for transmitting data output signals from said aircraft computer representing aircraft conditions;
- a test signal circuit for transmitting test data signals corresponding to said input data signals;
- internal data transmission circuits operatively connecting said processor, said program memory, said input circuits, said output circuits and said test signal circuit;
- means including said processor, said internal data transmitting circuits, said test signal circuit and a predetermined portion of said program memory for generating signals representing a predetermined sequence of said input data signals; and said system additionally comprising:
- a test fixture including:
  - a first fixture input circuit configured for connection to said plurality of data output circuits;
  - a second fixture input circuit configured for connection to said test signal circuit;
  - display means responsive to said first fixture input circuit for providing an operator indication of said aircraft conditions;
- means connected to said second fixture input circuit and to said plurality of data input circuits for transmitting said predetermined sequence of said input data signals to said aircraft computer.

* * * * *